(12) United States Patent
Robinson, Jr.

(10) Patent No.: US 6,883,269 B2
(45) Date of Patent: Apr. 26, 2005

(54) SYSTEM AND METHOD FOR VEHICULAR MOUNTED CHEMICAL AND ORGANIC AGENT DELIVERY

(75) Inventor: Richard David Robinson, Jr., Ft. Pierce, FL (US)

(73) Assignee: International Fly Masters, Inc., Ft. Pierce, FL (US)

( * ) Notice: Subject to any disclaimer, the term of this patent is extended or adjusted under 35 U.S.C. 154(b) by 0 days.

(21) Appl. No.: 10/155,230

(22) Filed: May 28, 2002

(65) Prior Publication Data

US 2003/0046859 A1 Mar. 13, 2003

Related U.S. Application Data

(60) Provisional application No. 60/323,386, filed on Sep. 20, 2001, and provisional application No. 60/293,175, filed on May 25, 2001.

(51) Int. Cl.[7] .............................................. A01M 7/00
(52) U.S. Cl. ...................................... 43/132.1; 43/900
(58) Field of Search ........................ 43/125, 129, 124, 43/132.1, 900; 239/77, 152, 154, 172, 332, 369

(56) References Cited

U.S. PATENT DOCUMENTS

| | | | | |
|---|---|---|---|---|
| 3,582,496 A | * | 6/1971 | Pfaffenbach | 43/129 |
| 3,607,780 A | * | 9/1971 | Scott | 43/129 |
| 3,648,401 A | * | 3/1972 | Stains | 43/129 |
| 3,793,762 A | * | 2/1974 | Stains | 43/124 |
| 3,893,622 A | * | 7/1975 | Waldron | 239/77 |
| 3,982,351 A | * | 9/1976 | Waldron | 43/129 |
| 4,182,491 A | * | 1/1980 | Parke et al. | 239/77 |
| 4,220,998 A | * | 9/1980 | Kays | 239/172 |
| 4,580,721 A | * | 4/1986 | Coffee et al. | 239/172 |
| 4,658,778 A | * | 4/1987 | Gamoh et al. | 239/152 |
| 4,688,349 A | * | 8/1987 | Renth | 43/124 |
| 4,721,246 A | * | 1/1988 | Lefebvre et al. | 43/900 |
| 4,803,626 A | * | 2/1989 | Bachman et al. | 239/172 |
| 4,886,208 A | * | 12/1989 | Strand | 239/77 |
| 4,930,702 A | * | 6/1990 | Vanderjagt | 239/172 |
| 4,992,206 A | * | 2/1991 | Waldrop | 239/77 |
| 5,052,618 A | * | 10/1991 | Carlon et al. | 239/77 |
| 5,248,448 A | * | 9/1993 | Waldron et al. | 239/77 |
| 5,269,461 A | * | 12/1993 | Davis | 239/77 |
| 5,310,113 A | * | 5/1994 | Cowgur | 239/172 |
| 5,315,564 A | * | 5/1994 | Upton | 239/77 |
| 5,419,493 A | * | 5/1995 | Redway | 239/172 |
| 5,439,173 A | * | 8/1995 | Waldrop | 239/77 |
| 5,478,013 A | * | 12/1995 | Ballu | 239/172 |
| 5,547,128 A | * | 8/1996 | Scheffler | 239/77 |
| 5,564,628 A | * | 10/1996 | Hall et al. | 239/77 |

(Continued)

FOREIGN PATENT DOCUMENTS

| | | | | |
|---|---|---|---|---|
| DE | 2829468 B1 | * | 1/1980 | 43/900 |
| DE | 4010707 B1 | * | 10/1991 | 43/900 |
| EP | 272740 B1 | * | 6/1988 | 43/900 |
| EP | 353132 B1 | * | 1/1990 | 43/900 |
| NL | 7900969 B1 | * | 8/1980 | 43/900 |
| RU | 820764 B1 | * | 4/1981 | 43/900 |

*Primary Examiner*—Darren W. Ark
(74) *Attorney, Agent, or Firm*—Greenberg Traurig, LLP; Richard E. Kurtz, II

(57) ABSTRACT

A system and method for vehicular mounted chemical and organic agent delivery. An apparatus and method are disclosed wherein an aluminum frame is utilized to mount a high power blower. The apparatus is designed to be mounted on a vehicle. A chemical or organic agent is loaded into a reservoir also mounted on the vehicle. By the use of a peristaltic pump, the chemical or organic agent is pumped into a nozzle and introduced into the wind flow, thereby allowing for airborne application of the agent. The apparatus has the ability to adjust the rate of the pump in accordance with a predetermined or constantly ascertained groundspeed. A user operates the vehicle and applies the chemical or organic agent at will.

8 Claims, 5 Drawing Sheets

U.S. PATENT DOCUMENTS

Figure 1:
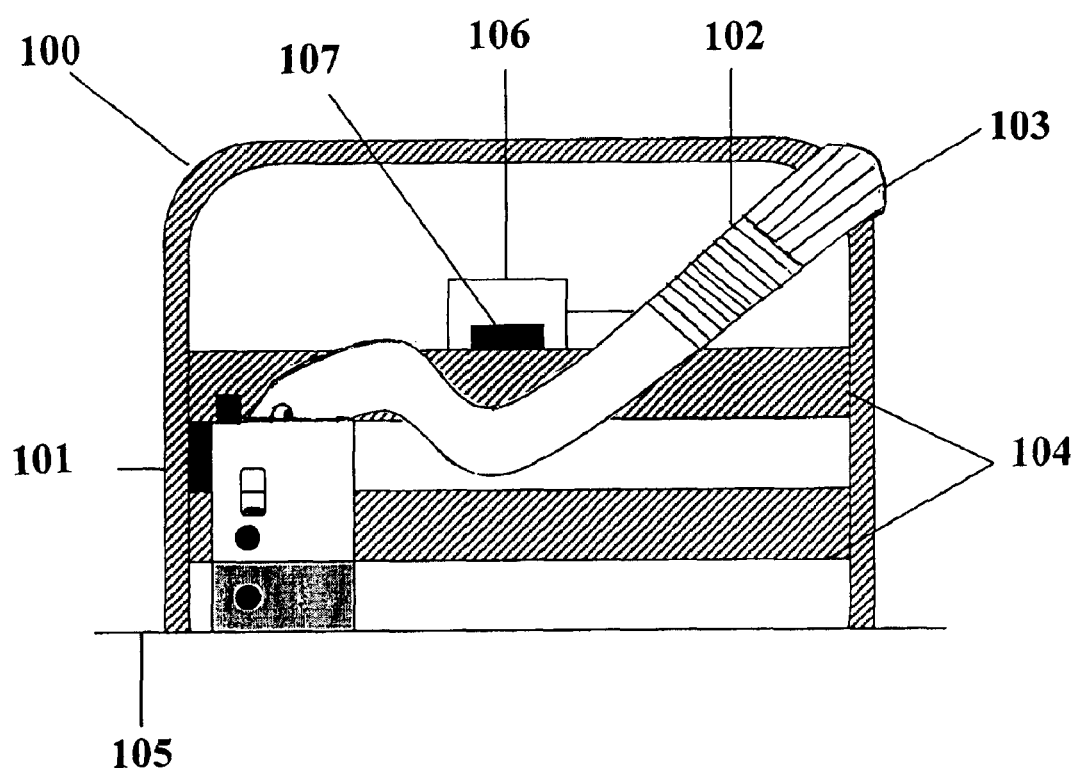

| | | | | |
|---|---|---|---|---|
| 5,718,377 A | * | 2/1998 | Tedders et al. | 239/77 |
| 5,756,046 A | * | 5/1998 | Winks et al. | 43/125 |
| 6,032,407 A | * | 3/2000 | Conner | 43/129 |
| 6,105,878 A | * | 8/2000 | Robinson et al. | 239/77 |
| 6,108,865 A | | 8/2000 | Veser et al. | 15/414 |
| 6,125,503 A | | 10/2000 | Callahan | 15/414 |
| 6,206,300 B1 | * | 3/2001 | Roudebush et al. | 239/77 |
| 6,336,594 B1 | * | 1/2002 | Bader et al. | 239/77 |
| 6,517,856 B1 | * | 2/2003 | Roe et al. | 43/132.1 |

* cited by examiner

SYSTEM AND METHOD FOR VEHICULAR MOUNTED CHEMICAL AND ORGANIC AGENT DELIVERY

This application claims the benefit of U.S. Provisional Patent Application Ser. No. 60/293,175, filed May 25, 2001 by Richard David Robinson, the entire disclosure of which is hereby incorporated by reference in its entirety. This application also claims the benefit of U.S. Provisional Patent Application No. 60/323,386, filed Sep. 20, 2001, and U.S. patent application Ser. No. 10/051,382, filed Jan. 22, 2002, the entire disclosures of which are incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to the field of pesticide delivery and in particular to a system and method for vehicular mounted chemical and organic delivery.

BACKGROUND OF THE INVENTION

Insects, and the damage they cause, are a serious economic threat to fruit and vegetable farmers worldwide. For example, importing countries will block fruit and vegetable shipments from certain exporting countries, rather than risk their phytosanitary status by importing foreign fruits and vegetables.

One type of insect that is of major concern is the fruit fly. There are over 4,000 species of fruit flies worldwide today. The genus *Anastrepha*, found throughout the Americas, Florida and the Caribbean Islands, comprises approximately 180 species. Of these 180 species, 7 cause serious economic damage.

The *Ceratitis Capatata*, commonly known as the Mediterranean Fruit Fly (Medfly), is the most widespread and damaging fruit fly in the world. The Medfly can currently be found in Guatemala and the Mexican states bordering Guatemala. If the Medfly reaches Oaxaca and/or Veracruz, it will have a corridor to the United States. Countermeasures, particularly effective means of pest control, are needed to prevent the spread of the Medfly to the United States.

Compounds known and popularly used in the art to control pests include Spinosad and Malathion. One commercial product which is well-known for use against the Medfly is SUCCESS (GF 120 and a spinosad concentration of 80 ppm), manufactured by Dow Agri Sciences. Currently, many other types of insecticides, herbicides, bacteriostats, fungicides, pesticides, plant nutrients or other active agents applied to crops and their surrounding environments are known in the field and are utilized regularly by growers to protect and fertilize crops.

Prior methods of application include manual application, foot-borne spraying, aerial application and tractor driven spraying. Manual and foot-borne sprayer applications are tedious tasks and inefficient at best. For example, if one were to place 3.7 gallons of SUCCESS into a container it would weigh a cumbersome 37 lbs. Often a spraying apparatus can weigh over 20 lbs. Thus an operator of such an apparatus would have to carry almost 60 lbs. while walking in often rugged environments. Aerial application is often thought of as the most efficient means of application. However, aerial application cannot be used effectively in or near populated areas, organic farms and environmentally sensitive areas. Aerial application does not effectively treat the area under the canopy, where it is ideal to apply insecticides, herbicides, bacteriostats, fungicides, pesticides, plant nutrients or other active agents. Aerial application to the top of the canopy leaves the composition exposed to UV Rays which will degrade the composition and leaves the composition exposed to the elements of nature which will cause erosion of the composition. Tractor-driven units, while suitable for their intended use, are subject to certain limitations similar to those of aerial application in that under certain conditions they are unable to reach the ideal target area in an efficient manner.

SUMMARY OF THE INVENTION

Accordingly, the present invention is directed to a system and method for vehicular mounted chemical or organic agent delivery that substantially obviates one or more of the problems due to limitations and disadvantages of the related art.

An object of the present invention is to provide a system and method of delivering a chemical or organic agent to otherwise inaccessible areas.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided a frame-mounted delivery system, for use with a motorized vehicle.

In another aspect of the present invention there is provided an apparatus and method for applying the chemical or organic agent in a controlled and relative manner in which the amount of chemical or organic agent applied is related to the speed of the vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification. The drawings are not necessarily drawn to scale, emphasis instead being placed upon illustrating the principles of the invention.

In the drawings:

FIG. 1 is a front cross-sectional view of an embodiment of the present invention.

FIG. 2 is a rear cross-sectional view of an embodiment of the present invention.

FIG. 3 is a close up side view of the nozzle mounted on a support member.

FIG. 3*a* is a cross sectional view of the nozzle shown in FIG. 3.

FIG. 4 is a top view depicting the base of an embodiment of the present invention.

DETAILED DESCRIPTION OF A PREFERRED EMBODIMENT

Reference will now be made in detail to the preferred embodiments of the present invention, examples of which are illustrated in the accompanying drawings.

FIG. 1 depicts a front cross-sectional view of an embodiment of the present invention. In this embodiment the frame 100 is designed to be mounted on an All Terrain Vehicle (ATV), fastened to a rack or fastened in a similar way, such as directly welding it to the frame or body of the vehicle. In accordance with a preferred embodiment of the invention, the frame is mounted to an ATV such as the Quad-Runner manufactured by Suzuki. Vehicles similar to Jeeps, Hummers and trucks, and, amphibious vehicles, boats and any specially designed vehicle are contemplated by the present invention.

Figure 2:
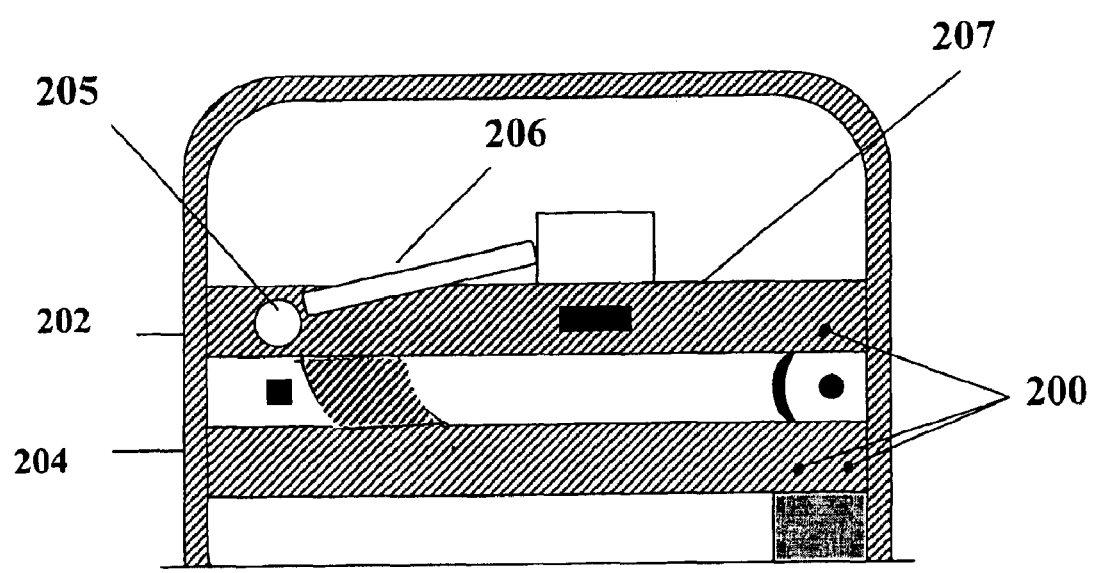
Figure 4:
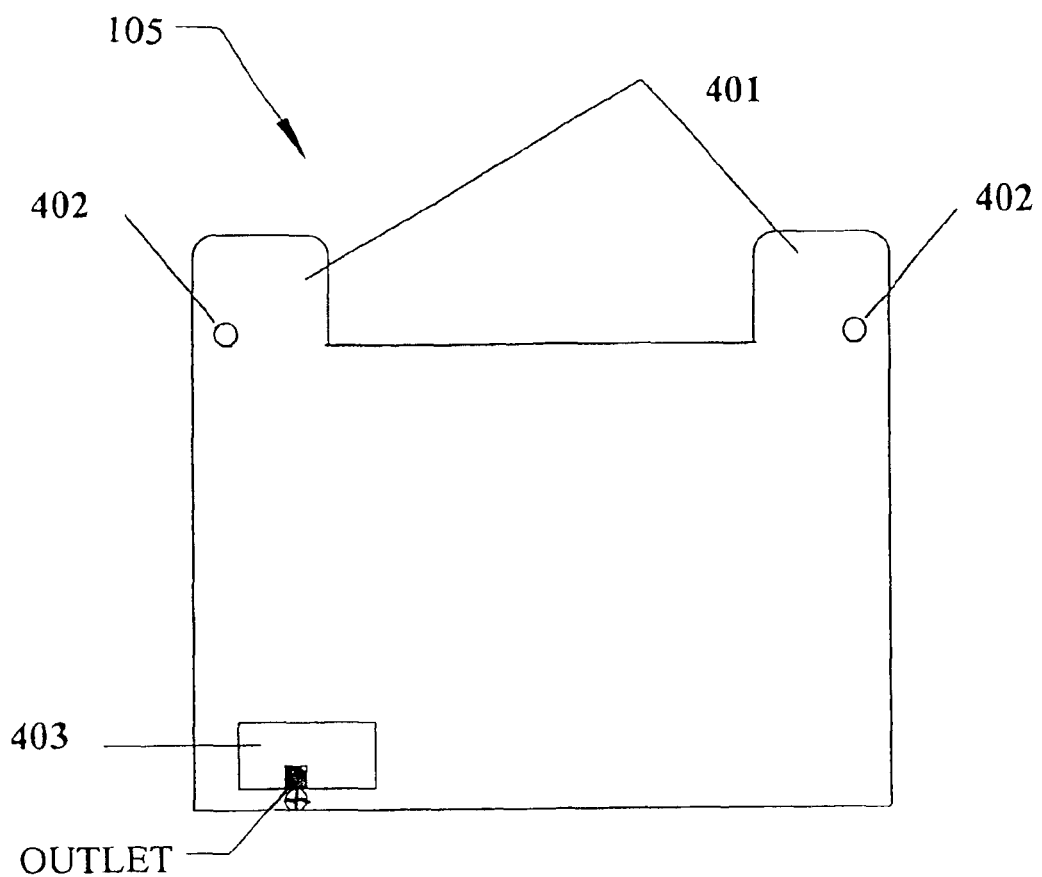

The frame is preferably comprised of aluminum piping and planar aluminum members that may be welded together. As shown in FIG. 2 a piece of aluminum piping 202 is used to form an arch. In the embodiment shown, piping of 1½" inside diameter was used to form the arch. Use of a singular piece of material, instead of welded together pieces allows for greater support and a stronger frame. Two cross-members 104 are present to provide support and to mount 200 the blower apparatus 101 upon. As shown in FIG. 4 the base of the frame 105 is comprised of a planar piece of aluminum in a preferred embodiment. In the embodiment shown the aluminum sheet is ¼ of an inch thick and the base 105 is 38 inches long and 15¼ inches wide. Two protrusions 401 allow for the frame 100 to fit into the rack present on an ATV in the present embodiment. It should be apparent to one of ordinary skill in the art that the base 105 and frame 100 of the present invention may be modified in order to allow the frame to fit on many different vehicles. The aluminum piping 202 used to form the arch is attached to the base 402. The fuel tank is housed within an aluminum box 403 with an outlet provided for the neck of the tank, so that the tank may be filled when needed. In the shown embodiment the tank was removed from the Stihl Model BR420 and fit into the aluminum box 403. In the embodiment shown the aluminum box 403 housing the gas tank, is 1 foot long, 4 inches tall, 6 inches wide with a 1¼ inches diameter neck.

A blower apparatus 101 is mounted 200 on the frame 100. In the shown embodiment a Stihl Model BR420 blower apparatus is utilized. The backpack apparatus, such as that shown in U.S. Pat. No. 6,125,503 to Callahan was removed and the mounts on the Stihl Model BR420 utilized to mount 200 the blower apparatus on the frame 100. Any blower similar to that disclosed in U.S. Pat. No. 6,108,865 to Veser et. al could be utilized in the present invention, if able to produce winds of approximately 180 miles per hour.

Figure 3:
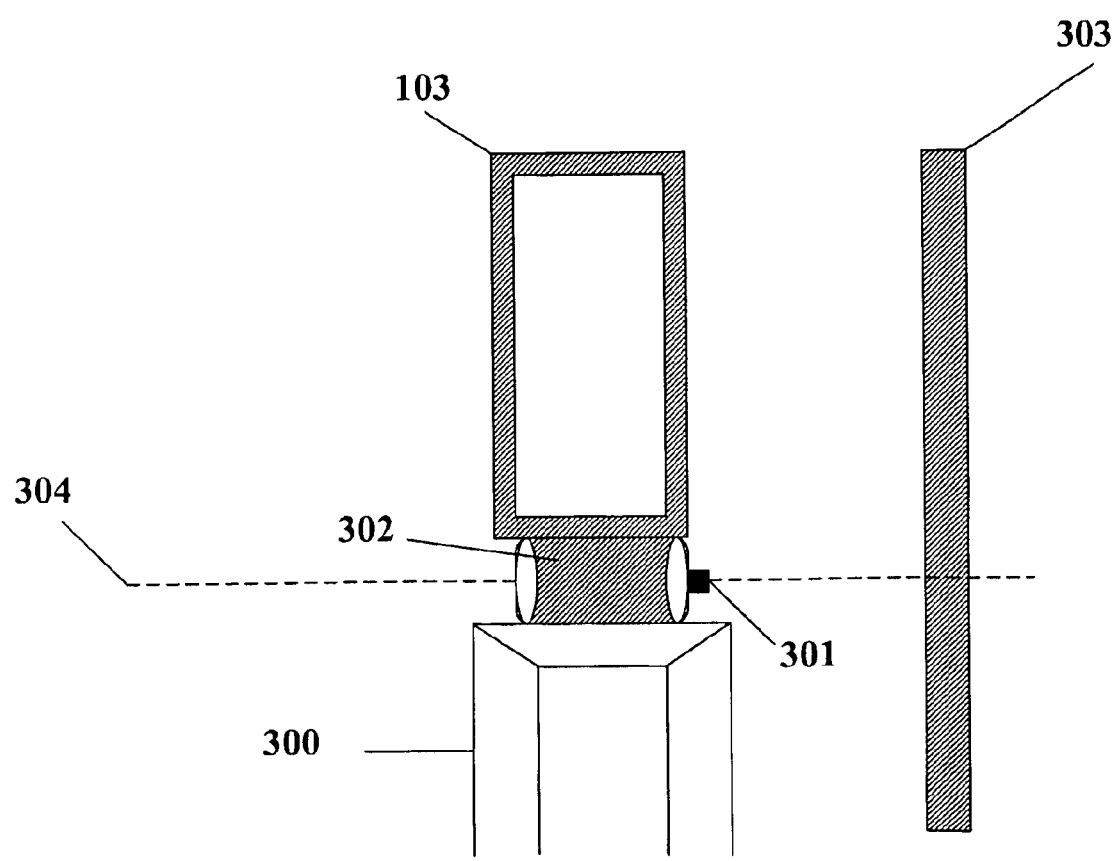
Figure 3A:
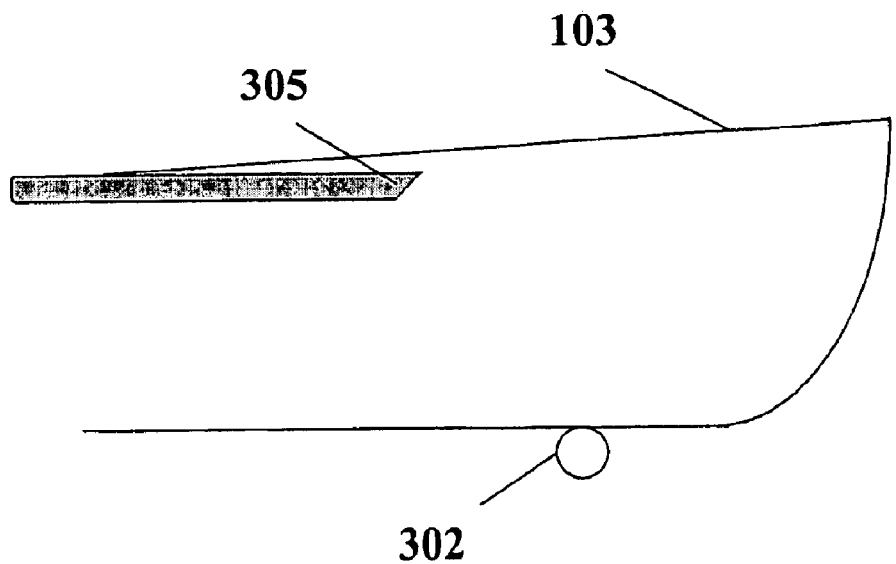

The tube 102 extending from the motor area of the blower apparatus is fitted into the base of the nozzle 103 and secured thereto. In the shown embodiment two cross-members 104 are present to provide support and to mount 200 the blower apparatus 101 upon. FIG. 3 depicts a close up frontal view of the nozzle 103 mounted on the support member 300. The nozzle's 103 angle of spray can be adjusted via rotation on an axis 304 provided by the use of a bolt 301 or other similar fastening apparatus which is housed within a channel formed by a cylindrical sleeve 302 that is attached to the nozzle 103 by welding or similar means. The support member is attached, in this embodiment by welding it to the area of the base 105 directly in front of the vertical pipe 303 constituting part of the frame 100.

FIG. 2 depicts a rear view of an embodiment of the present invention. The operating controls 204 in the shown embodiment were removed from the Stihl Model BR420 blower apparatus and fastened to a support member 205 comprised of aluminum piping. In the shown embodiment the controls were attached by using a circular pipe clamp (not shown in the drawing). Other similar fastening devices such as adhesives and heat-bonding are contemplated by the present invention.

The controls are able to be locked, enabling the blower 101 to operate at a constant number of RPM. Operation of the throttle-locking mechanism is optional, but desirable as the operator is then free to operate the controls of the vehicle.

Additionally, the amount of chemical or organic agent dispensed by the present invention can be applied in a controlled and relative manner in which the amount of chemical or organic agent applied is relative to the speed of the vehicle. A formula for application of the chemical or organic agent is: [Gallons Per Acre*Miles Per Hour*Swath Width (in feet)]/495 Volume Per Minute (in gallons)

The present embodiment, mounted on an ATV, utilizes a Masterflex Model No. 7533-50, 7533-60, 7533-70 or 7533-80 peristaltic pump with controls for the pump 207 being mounted on one of the cross members 104 of the frame.

One may utilize the pump controls 207 in order to set the rate of administration of the pump relative to the anticipated speed at which the operator will travel. Alternatively, speed detection means such as a radar apparatus may be mounted on the vehicle and the speed detection means will transfer information of the vehicle's speed to the peristaltic pump 106 whereby the peristaltic pump 106 may accordingly adjust the rate of administration. The chemical or organic agent is administered into the nozzle via tubing, such as ¼" copper tubing 206 shown in the present embodiment.

The tubing 206 is connected to a peristaltic pump housed within a box 106 formed by aluminum members. The pump can be accessed by removing the top of the aluminum box which rotates on a hinge 107. The peristaltic pump of the present embodiment operates at up to 600 RPM.

The opposite end of the tubing 305 travels up into the nozzle 103 and runs generally laterally along the top of the nozzle 103 but does not extend out of the end of the nozzle. The end of the tubing in the nozzle 305 is cut at an angle, allowing the open end of the tube to face downward. In the shown embodiment the tubing was cut at a 45° angle. The downward orientation and angle allow for the chemical or organic agent to be delivered and drawn into the air stream created by the blower 101 by gravity.

A reservoir of chemical or organic agent is mounted somewhere on the vehicle. In the present embodiment the reservoir is mounted on the front rack of an ATV. The peristaltic pump 106 is connected to the reservoir by a piece of tubing. In the present embodiment a piece of ⅜" rubber tubing was utilized to provide the flow to the suction side of the peristaltic pump 106.

In the embodiment shown, the frame is mounted on the rear of an ATV. The blower controls 204 are easily accessible at the side of the operator of the vehicle. A user of the present invention, initially needs to set the peristaltic pump 106, unless means of speed detection are used to constantly change the pump's rate. The operator may then set the controls 204 of the blower to a constant rate, as recommended or utilize them in manual fashion. Once the pump and blower controls are set, the operator need only drive the vehicle and apply the chemical or organic agent as so desired.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An apparatus for dispensing a chemical or organic agent, comprising:

a frame, attachable to a vehicle in a manner whereby the weight of the frame is supported by the vehicle;

an air blower, mounted upon the frame;

a nozzle, mounted on an end of the blower;

a reservoir holding a chemical or organic agent formulated for use against fruit flies and including a bait material;

a pump for pumping the chemical or organic agent;

a tube connecting the pump and blower for feeding the chemical or organic agent into the nozzle;

a control for monitoring and controlling the flow of the chemical or organic agent into the nozzle.

2. The apparatus of claim 1, wherein the nozzle is positioned on the end of the air-blower and configured to modify the air-flow produced by the air-blower and to introduce the chemical or organic agent into the air-flow.

3. The apparatus of claim 1, wherein the controls are connected to a speed detecting mechanism which is used to control the flow of the chemical or organic agent in relation to the speed of the carrying vehicle.

4. The apparatus in accordance with claim 1, wherein said chemical or organic agent formulated for use against fruit flies comprises a spinosad.

5. The apparatus in accordance with claim 1, wherein said bait comprises a protein material bait.

6. The apparatus in accordance with claim 5, wherein said protein bait comprises GF 120.

7. A vehicular mounted chemical and organic agent distribution system, comprised of:

a vehicle;

a reservoir holding a chemical or organic agent formulated for use against fruit flies and including a bait material, which is mounted to said vehicle;

a frame, mounted to said vehicle in a manner whereby the weight of the frame is supported by the vehicle;

a pump, attached to said frame;

a first tube connected between said reservoir and a first end of said pump, for carrying said agent to said pump;

a pump control, for controlling the rate of chemical or organic agent flow through said pump;

a blower attached to said frame;

a nozzle connected to an exhaust end of said blower;

a blower control, for controlling the rate of air flow from said blower; and a second tube connected between a second end of said pump and said nozzle, for delivering said chemical or organic agent into said nozzle.

8. A method for dispensing a chemical or organic agent, comprising:

mounting an air blower to a frame;

mounting the frame to a vehicle in a manner whereby the weight of the frame is supported by the vehicle;

mounting a reservoir to the vehicle or frame;

filling the reservoir with a chemical or organic agent formulated for use against fruit flies and including a bait material;

mounting a pump to the frame;

connecting a suction end of the pump to the reservoir with a tube;

connecting an evacuation end of the pump to a nozzle, which is mounted on an end of the blower;

pumping the chemical or organic agent into an air-stream created by the air blower.

* * * * *